(12) United States Patent
Sundarrajan et al.

(10) Patent No.: US 9,519,439 B2
(45) Date of Patent: Dec. 13, 2016

(54) ON-DEMAND SNAPSHOT AND PRUNE IN A DATA STORAGE SYSTEM

(71) Applicant: Compellent Technologies, Eden Prairie, MN (US)

(72) Inventors: Pradeep Sundarrajan, Minneapolis, MN (US); Melwyn D'Souza, Edina, MN (US)

(73) Assignee: Dell International L.L.C., Round Rock, TX (US)

( * ) Notice: Subject to any disclaimer, the term of this patent is extended or adjusted under 35 U.S.C. 154(b) by 364 days.

(21) Appl. No.: 14/012,331

(22) Filed: Aug. 28, 2013

(65) Prior Publication Data
US 2015/0067231 A1  Mar. 5, 2015

(51) Int. Cl.
*G06F 12/00* (2006.01)
*G06F 3/06* (2006.01)
*G06F 11/34* (2006.01)

(52) U.S. Cl.
CPC .............. *G06F 3/065* (2013.01); *G06F 3/0608* (2013.01); *G06F 3/0685* (2013.01); *G06F 11/3409* (2013.01); *G06F 11/3485* (2013.01); *G06F 2201/81* (2013.01); *G06F 2201/84* (2013.01)

(58) Field of Classification Search
CPC ...... G06F 3/065; G06F 3/0685; G06F 3/0608; G06F 11/1402; G06F 3/0604; G06F 3/0688
See application file for complete search history.

(56) References Cited

U.S. PATENT DOCUMENTS

| | | | | |
|---|---|---|---|---|
| 7,047,358 | B2* | 5/2006 | Lee | G06F 11/1076 707/999.202 |
| 7,293,196 | B2* | 11/2007 | Hicken | G06F 11/2092 711/120 |
| 7,398,418 | B2* | 7/2008 | Soran | G06F 3/0608 711/114 |
| 7,613,945 | B2* | 11/2009 | Soran | G06F 3/0608 714/5.11 |
| 8,468,292 | B2 | 6/2013 | Aszmann et al. | |
| 2007/0260830 | A1* | 11/2007 | Faibish | G06F 3/061 711/162 |

(Continued)

OTHER PUBLICATIONS

John Wilkes, Richard Golding, Carl Staelin, and Tim Sullivan The HP AutoRAID Hierarchical Storage System, ACM Transactions on Computer Systems, vol. 14, No. 1, Feb. 1996, pp. 108-136.*

*Primary Examiner* — Hal Schnee
*Assistant Examiner* — Francisco Grullon
(74) *Attorney, Agent, or Firm* — Winthrop & Weinstine, P.A.

(57) ABSTRACT

A method of data progression in a data storage system having at least two tiers of storage space. A first tier may include storage space in a SLC SSD and a second tier may include storage space in a MLC SSD. The method may include setting a predetermined free space threshold for the first tier of storage space, monitoring free space in the first tier of storage space, and when the amount of available free space in the first tier of storage space decreases to the predetermined free space threshold, generating an on-demand snapshot of at least a portion of the data of the first tier of storage space by designating that data as read-only. The on-demand snapshot may then be transferred to the second tier of storage space, thereby freeing the corresponding portion of data of the first tier of storage space for new writes.

14 Claims, 4 Drawing Sheets

(56) References Cited

U.S. PATENT DOCUMENTS

| | | | |
|---|---|---|---|
| 2008/0005468 A1* | 1/2008 | Faibish | G06F 3/0622 711/114 |
| 2008/0091877 A1* | 4/2008 | Klemm | G06F 3/061 711/114 |
| 2010/0037023 A1* | 2/2010 | Aszmann | G06F 3/0608 711/114 |
| 2011/0010488 A1* | 1/2011 | Aszmann | G06F 3/0608 711/103 |
| 2011/0161299 A1* | 6/2011 | Prahlad | G06F 17/30091 707/649 |
| 2011/0197017 A1* | 8/2011 | Yu | G06F 12/0246 711/103 |
| 2012/0036309 A1* | 2/2012 | Dillow | G06F 11/108 711/103 |
| 2013/0024423 A1* | 1/2013 | Doshi | G06F 11/1448 707/640 |
| 2013/0254458 A1 | 9/2013 | Pittelko | |

* cited by examiner

ON-DEMAND SNAPSHOT AND PRUNE IN A DATA STORAGE SYSTEM

FIELD OF THE INVENTION

The present disclosure relates generally to data progression in a data storage system. Particularly, the present disclosure relates to generating snapshots, as at least a part of overall data progression, in an unconventional on-demand manner. More particularly, the present disclosure relates to data progression in a data storage system having single level cell (SLC) and multilevel cell (MLC) solid state devices or other hybrid or tiered-based storage, wherein snapshots are generated in an unconventional on-demand manner to move or progress data from SLC to MLC devices, or generally from one tier of storage to another lower cost tier, when more desirable.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems, such as storage centers or other data storage systems or subsystems, comprising mass storage devices, such as but not limited to disk drives, solid state drives, or virtual disk drives allow the efficient storage of data by allocating user data across a pool of storage and a plurality of drives based on, for example, RAID-to-disk mapping. Data progression may be utilized in such systems to move data gradually to storage space of appropriate overall cost for the data, depending on, for example but not limited to, the data type or access patterns for the data. In addition, such drive systems may protect data from, for example, system failures or virus attacks by automatically generating and storing snapshots or point-in-time copies (PITCs) of the system or matrix of drive storage blocks at, for example, predetermined time intervals, user configured dynamic time stamps, such as, every few minutes or hours, etc., or at times directed by the server. These time-stamped snapshots permit the recovery of data from a previous point in time prior to the system failure, thereby restoring the system as it existed at that time. Such systems are further described in U.S. Pat. No. 7,613,945, titled "Virtual Disk Drive System and Method," issued Nov. 3, 2009, U.S. Pat. No. 8,468,292, titled "Solid State Drive Data Storage System and Method," issued Jun. 18, 2013, and U.S. patent application Ser. No. 13/429,511, titled "Single-Level Cell and Multi-Level Cell Hybrid Solid State Drive," filed Mar. 26, 2012, each of which is incorporated by reference herein in its entirety.

One problem that may exist in such systems, however, is that in certain circumstances, a snapshot or PITC may unnecessarily consume space in a higher cost storage tier. For example, PITCs in any given system may be configured to expire after a certain amount of time or based on the occurrence of a specific event or number of events, etc. In many cases, after a PITC expires, it no longer needs to be stored in the system nor does it need to be available for users. However, if such an expired PITC has the active PITC (i.e., the current volume or PITC that handles write requests) as its child and coalescing with the active PITC is not permitted or is otherwise disabled, then the expired PITC will often be in a frozen state until another snapshot is taken before coalescing of the expired PITC is possible, thereby holding allocated pages of data hostage in a higher cost storage tier, resulting in unnecessary space consumption of the higher cost storage, which is often more desirably utilized for active data pages. FIG. 1, which shows an active PITC 102 and its parent PITC 104, illustrates the unnecessary resulting space consumption. In FIG. 1, a total of nine (9) data pages 106 are allocated between the active PITC 102 and the frozen PITC 104. That is, nine pages of data are currently allocated and unavailable for new writes. However, pages 1, 2, and 5 of the frozen PITC 104 have been "overwritten," likely utilizing a copy-on-write algorithm, as pages 6, 7, and 9 in the active PITC, and as such, pages 1, 2, and 5 simply become historical data, which desirably may be stored in lower cost storage for historical purposes, such as but not limited to, backup purposes. Yet, because PITC 104 has the active PITC as its child and cannot be coalesced therewith, pages 1, 2, and 5 remain on high cost storage until another snapshot is generated, which depending on the system configuration or set-up, could be a significant span of time. Until another snapshot is generated, pages 1, 2, and 5 remain hostage, and cannot be reclaimed for better use of the space. Active PITCs, expiring PITCs, and coalescing PITCs are described in further detail in U.S. Pat. No. 7,613,945, previously incorporated by reference herein.

For additional cost, solid state device systems, either comprising or consisting entirely of solid state storage devices, such as SLC solid state drives (SSDs) and/or MLC SSDs, can provide better input/output (I/O) performance as compared to storage systems consisting of only disk drives. The read performance of SLC and MLC drives is essentially the same. However, SLC drives typically have faster write performance and can handle more write I/Os (i.e., have higher endurance or life span) as compared to MLC drives. Accordingly, SLC drives are typically more expensive than MLC drives. To balance cost, life span, and performance of a solid state device system, the system may be designed to have both SLC and MLC drives, as described in detail in U.S. Pat. No. 8,468,292 and U.S. patent application Ser. No. 13/429,511, which were previously incorporated by reference.

In such "hybrid" systems, SLC drive space may be preferred for new page write I/O (i.e., where the system allocates a new page(s)), but the system may move to MLC drive space when the SLC space becomes fully occupied. If the hybrid system utilizes data progression or automated tiering, then it could desirably move SLC pages that are part of snapshots or PITCs to lower cost tiers due to their lower usage, as described in U.S. Pat. No. 8,468,292 and U.S. patent application Ser. No. 13/429,511. However, if the hybrid system does not utilize data progression or automated tiering, or if the system has volumes that are snapshot capable but the system cannot or is not configured to take snapshots at regular or otherwise predetermined intervals to move pages to lower cost tiers, then such volumes will quickly and unnecessarily consume the SLC drive space as they continue to receive new page write I/Os. Thus, the system will be more quickly required to rely on MLC drive space for new page write I/Os. As this persists, it can reduce overall write performance of the system and more quickly wear out the MLC drives.

In some solid state device systems, data progression or automated tiering may usually move snapshot or PITC pages, due to their lower usage, to MLC drives or other lower cost tier(s) (e.g., disk drives, which may also be tiered), which can help free up SLC drive space. In such systems, however, if coalescing snapshot or frozen PITCs into an active PITC is enabled, then during coalesce, lower tier pages (if present) in a frozen PITC will be moved to the active PITC. As a result, any writes to those lower tier pages of the active PITC will likely be slower and degrade overall system performance. Additionally, frequent writes to the lower tier pages, if stored on MLC drive space, will more quickly wear out the MLC drive(s). If, on the other hand, the system is configured to move all lower tier pages of the active PITC (after a coalesce, for example) to a higher cost tier (such as a SLC tier) in order to improve performance, then this will increase space consumption in the higher cost tier, which could result with lower tier space being utilized for new page I/O, which could also reduce overall system performance. For example, the active PITC may not receive write requests for some or many of the pages moved from the lower cost tier to the higher cost tier, and thus the move would unnecessarily tie up higher tier drive space.

Thus, there is a need in the art for improved data progression in a data storage system. Particularly, there is a need in the art for methods and systems for generating snapshots, as at least a part of overall data progression, in an on-demand manner. More particularly, there is a need in the art for methods and systems for data progression in a data storage system having SLC and MLC devices or other hybrid or tiered-based storage, wherein snapshots are generated in an unconventional on-demand manner to move or progress data from SLC to MLC devices, or generally from one tier of storage to another lower cost tier, in a more desirable and efficient manner.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

The present disclosure, in one embodiment, relates to a method of data progression in a data storage system having at least two tiers of storage space. A first tier may include storage space in a SLC SSD and a second tier may include storage space in a MLC SSD. The method may include setting a predetermined free space threshold for the first tier of storage space that is a threshold relating to the amount of free space available on the first tier of storage space, monitoring free space in the first tier of storage space, and when the amount of available free space in the first tier of storage space decreases to the predetermined free space threshold, generating an on-demand snapshot of at least a portion of the data of the first tier of storage space by designating that data as read-only. The on-demand snapshot may then be transferred to the second tier of storage space, thereby freeing the corresponding portion of data of the first tier of storage space for new writes. The method may also include, in addition to generating on-demand snapshots, generating snapshots of at least a portion of the data of the first tier of storage space and transferring at least some of the generated snapshots to the second tier of storage space at regular intervals. In some embodiments, the storage space of the SLC SSD may be configured as RAID 10 storage and the storage space of the MLC SSD may be configured as RAID 5 storage. The data storage system may generally store data for a plurality of logical volumes, and the on-demand snapshot may be generated for data from one of the logical volumes utilizing the most storage space in the first tier. The data storage system may generally use copy-on-write techniques, and more specifically, when a write operation is received by the data storage system directed to data stored by the on-demand snapshot, the write operation may be directed instead to newly allocated storage space of the first tier of storage space, and the corresponding data in the on-demand snapshot can be considered overwritten. The method may thus further include freeing overwritten data of the on-demand snapshot. In some embodiments, the overwritten data of the on-demand snapshot may be freed substantially as soon as the data is overwritten. In other embodiments, however, the overwritten data of the on-demand snapshot may be freed according to a batch pruning method that operates on at least a portion of the second tier of storage space as a batch and frees all overwritten data of the batch. The batch pruning method may be triggered based on a variety of events. However, in one embodiment, the batch pruning method may be triggered when the amount of available free space in the second tier of storage space decreases to a predetermined free space threshold for the second tier of storage. In another embodiment, the batch pruning method may be triggered according to a periodic schedule. In some embodiments, the on-demand snapshot may be generally utilized internally solely by the data storage system and may not generally be accessible by a user of the data storage system.

The present disclosure, in another embodiment, relates to an information handling system including a data storage subsystem having at least two tiers of storage space, a first tier comprising storage space in a single level cell (SLC) solid state device (SSD) and a second tier comprising storage space in a multi-level cell (MLC) SSD. A controller managing the data storage subsystem may be configured to monitor free space in the first tier of storage space, and when the amount of available free space in the first tier of storage space decreases to a predetermined free space threshold, generate an on-demand snapshot of at least a portion of the data of the first tier of storage space by designating that data as read-only. The controller may be further configured to transfer the on-demand snapshot to the second tier of storage space, thereby freeing the corresponding at least a portion of data of the first tier of storage space for new writes. As described above, in one embodiment, the storage space of the SLC SSD may be configured as RAID 10 storage and the storage space of the MLC SSD may be configured as RAID 5 storage. A write operation received by the data storage system directed to data stored by the on-demand snapshot maybe be directed instead to newly allocated storage space of the first tier of storage space, and the corresponding data in the on-demand snapshot is considered to be overwritten. The controller may also be configured to free overwritten data of the on-demand snapshot. As described above, the controller may be configured to free overwritten data of the on-demand snapshot according to a batch pruning method that operates on at least a portion of the second tier of storage space as a batch and frees all overwritten data. The batch pruning method may be run according to a periodic schedule. As also generally indicated above, the on-demand snapshot may be utilized internally by the controller and may not generally be accessible by a user of the data storage system.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

Figure 1:
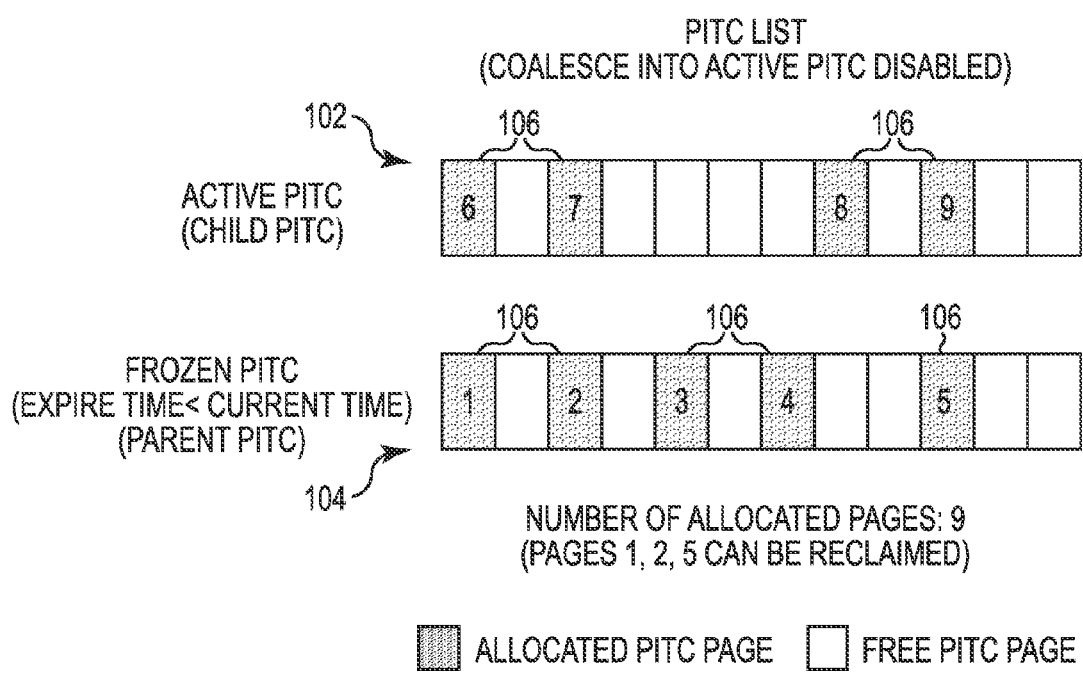
FIG. 1 is a schematic representation of an active PITC and its parent PITC, illustrating an occurrence of unnecessary space consumption.

The present disclosure relates generally to novel and advantageous systems and methods for data progression in a data storage system. Particularly, the present disclosure relates to generating snapshots, as at least a part of overall data progression, in an unconventional on-demand manner. More particularly, the present disclosure relates to systems and methods for data progression in a data storage system having SLC and MLC SSDs or other hybrid or tiered-based storage, wherein snapshots are generated in an unconventional on-demand manner to move or progress data from SLC to MLC devices, or generally from one tier of storage to another lower cost tier, in a more desirable and efficient manner.

For purposes of this disclosure, any system or information handling system described herein may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, a system or any portion thereof may be a personal computer (e.g., desktop or laptop), tablet computer, mobile device (e.g., personal digital assistant (PDA) or smart phone), server (e.g., blade server or rack server), a network storage device, or any other suitable device or combination of devices and may vary in size, shape, performance, functionality, and price. A system may include random access memory (RAM), one or more processing resources such as a central processing unit (CPU) or hardware or software control logic, ROM, and/or other types of nonvolatile memory. Additional components of a system may include one or more disk drives or one or more mass storage devices, one or more network ports for communicating with external devices as well as various input and output (I/O) devices, such as a keyboard, a mouse, touchscreen and/or a video display. Mass storage devices may include, but are not limited to, a hard disk drive, floppy disk drive, CD-ROM drive, smart drive, flash drive, or other types of non-volatile data storage, a plurality of storage devices, or any combination of storage devices. A system may include what is referred to as a user interface, which may generally include a display, mouse or other cursor control device, keyboard, button, touchpad, touch screen, microphone, camera, video recorder, speaker, LED, light, joystick, switch, buzzer, bell, and/or other user input/output device for communicating with one or more users or for entering information into the system. Output devices may include any type of device for presenting information to a user, including but not limited to, a computer monitor, flat-screen display, or other visual display, a printer, and/or speakers or any other device for providing information in audio form, such as a telephone, a plurality of output devices, or any combination of output devices. A system may also include one or more buses operable to transmit communications between the various hardware components.

While the various embodiments are not limited to any particular type of information handling system, the systems and methods of the present disclosure may be particularly useful in the context of a storage center comprising mass storage devices, such as but not limited to disk drive and solid state drive systems, or virtual disk drive systems, such as that described in U.S. Pat. No. 7,613,945, U.S. Pat. No. 8,468,292, and U.S. patent application Ser. No. 13/429,511, which were previously incorporated herein by reference. Such data storage systems allow the efficient storage of data by dynamically allocating user data across a page pool of storage, or a matrix of drive storage blocks, and a plurality of drives based on, for example, RAID-to-disk mapping. In general, dynamic allocation presents a virtual disk or storage device or volume to user servers. To the server, the volume acts the same as conventional storage, such as a disk drive, yet provides a storage abstraction of multiple storage devices, such as RAID (redundant array of independent disks) devices, to create a dynamically sizeable storage device. Data progression may be utilized in such disk drive systems to move data gradually to storage space of appropriate overall cost for the data, depending on, for example but not limited to, the data type or access patterns for the data. In general, data progression may determine the cost of storage in the drive system considering, for example, the monetary cost of the physical storage devices, the efficiency of the physical storage devices, and/or the RAID level of logical storage devices. Based on these determinations, data progression may move data accordingly such that data is stored on the most appropriate cost storage available. In addition, such drive systems may protect data from, for example, system failures or virus attacks by automatically generating and storing snapshots or point-in-time copies of the system or matrix of drive storage blocks at, for example, predetermined time intervals, user configured dynamic time stamps, such as, every few minutes or hours, etc., or at times directed by the server. These time-stamped snapshots permit the recovery of data from a previous point in time prior to the system failure, thereby restoring the system as it existed at that time. These snapshots or point-in-time copies may also be used by the system or system users for other purposes, such as but not limited to, testing, while the main storage can remain operational. Generally, using snapshot capabilities, a user may view the state of a storage system as it existed in a prior point in time.

Figure 2:
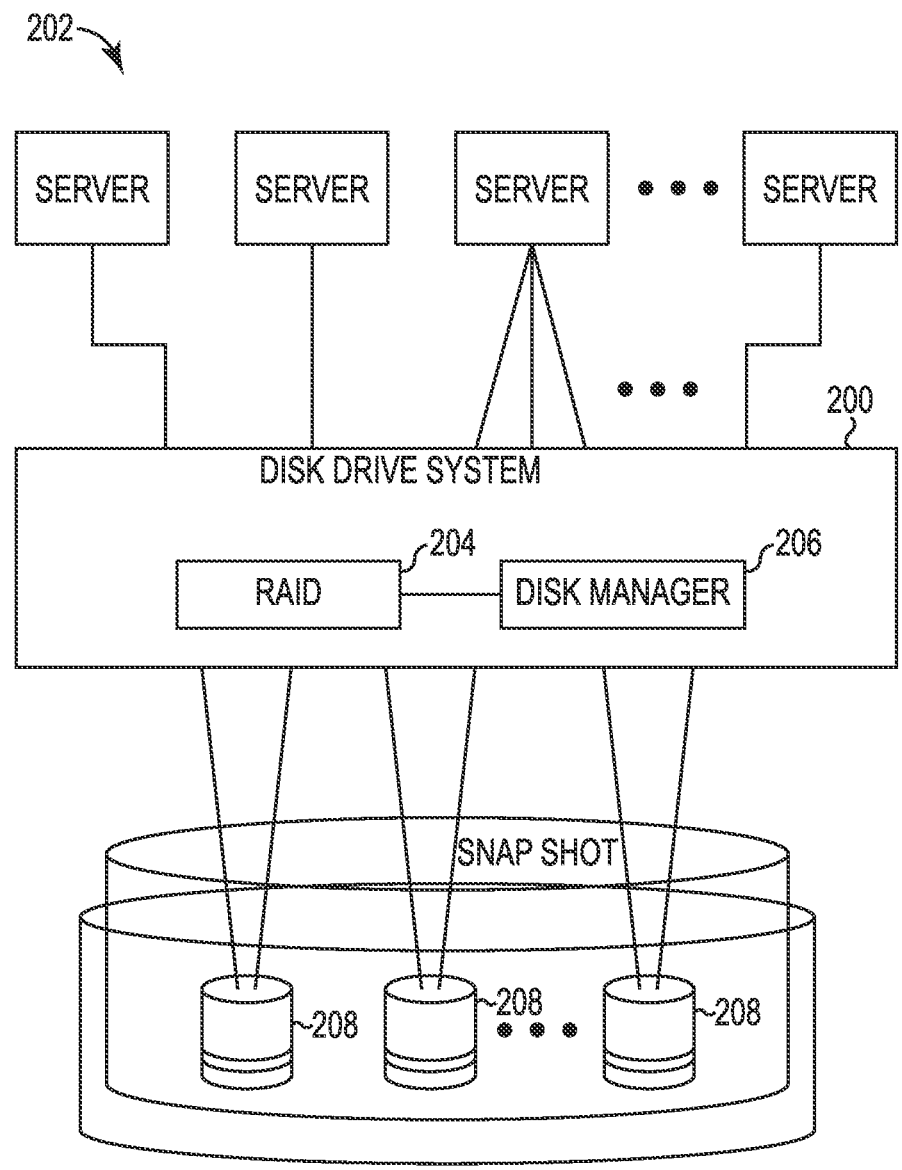
FIG. 2 is a schematic of an information handling system, in the form of a data storage system, suitable for the various embodiments of on-demand snapshot of the present disclosure.

FIG. 2 illustrates one embodiment of a disk drive or data storage system 200 in an information handling system environment 202, such as that disclosed in U.S. Pat. No. 7,613,945, U.S. Pat. No. 8,468,292, and U.S. patent application Ser. No. 13/429,511, and suitable with the various embodiments of the present disclosure. As shown in FIG. 2, the disk drive system 200 may include a data storage subsystem 204, which may include, but is not limited to, a RAID subsystem, as will be appreciated by those skilled in the art, and a disk or drive manager 206 having at least one disk storage system controller. The data storage subsystem 204 and disk/drive manager 206 can dynamically allocate data across drive space of a plurality of disk drives or other suitable storage devices 208, such as but not limited to optical drives, solid state drives, tape drives, etc., based on, for example, RAID-to-disk mapping or other storage mapping technique. The data storage subsystem 204 may include data storage devices distributed across one or more data sites at one or more physical locations, which may be network connected. Any of the data sites may include original and/or replicated data (e.g., data replicated from any of the other data sites) and data may be exchanged between the data sites as desired.

In the various embodiments of the present disclosure, one or more programs or applications, such as a web browser, and/or other applications may be stored in one or more of the system data storage devices. Programs or applications may be loaded in part or in whole into a main memory or processor during execution by the processor. One or more processors may execute applications or programs to run systems or methods of the present disclosure, or portions thereof, stored as executable programs or program code in the memory, or received from the Internet or other network. Any commercial or freeware web browser or other application capable of retrieving content from a network and displaying pages or screens may be used. In some embodiments, a customized application may be used to access, display, and update information.

Hardware and software components of the present disclosure, as discussed herein, may be integral portions of a single computer or server or may be connected parts of a computer network. The hardware and software components may be located within a single location or, in other embodiments, portions of the hardware and software components may be divided among a plurality of locations and connected directly or through a global computer information network, such as the Internet.

As will be appreciated by one of skill in the art, the various embodiments of the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, middleware, microcode, hardware description languages, etc.), or an embodiment combining software and hardware aspects. Furthermore, embodiments of the present disclosure may take the form of a computer program product on a computer-readable medium or computer-readable storage medium, having computer-executable program code embodied in the medium, that define processes or methods described herein. A processor or processors may perform the necessary tasks defined by the computer-executable program code. Computer-executable program code for carrying out operations of embodiments of the present disclosure may be written in an object oriented, scripted or unscripted programming language such as Java, Perl, PHP, Visual Basic, Smalltalk, C++, or the like. However, the computer program code for carrying out operations of embodiments of the present disclosure may also be written in conventional procedural programming languages, such as the C programming language or similar programming languages. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the context of this document, a computer readable medium may be any medium that can contain, store, communicate, or transport the program for use by or in connection with the systems disclosed herein. The computer-executable program code may be transmitted using any appropriate medium, including but not limited to the Internet, optical fiber cable, radio frequency (RF) signals or other wireless signals, or other mediums. The computer readable medium may be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

Various embodiments of the present disclosure may be described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks. Alternatively, computer program implemented steps or acts may be combined with operator or human implemented steps or acts in order to carry out an embodiment of the invention.

Additionally, although a flowchart may illustrate a method as a sequential process, many of the operations in the flowcharts illustrated herein can be performed in parallel or concurrently. In addition, the order of the method steps illustrated in a flowchart may be rearranged for some embodiments. Similarly, a method illustrated in a flow chart could have additional steps not included therein or fewer steps than those shown. A method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an ingredient or element may still actually contain such item as long as there is generally no measurable effect thereof.

As stated above, for a variety of reasons and to solve a number of issues in conventional data storage systems, there is a need in the art for improved data progression in a data storage system, and particularly, for methods and systems for generating snapshots, as at least a part of overall data progression, in an on-demand manner, which can be particularly desirable in hybrid storage systems utilizing SLC and MLC devices or other hybrid or tiered-based storage. The present disclosure improves on conventional systems and processes for data progression in a data storage system or other information handling system, such as but not limited to the type of data storage systems described in U.S. Pat. No. 7,613,945, U.S. Pat. No. 8,468,292, and U.S. patent application Ser. No. 13/429,511. The disclosed improvements can provide more efficient storage space utilization, and particularly in systems utilizing SLC and MLC devices, can more efficiently utilize the different SSD types to a system's advantage.

In one embodiment of the present disclosure, in a data storage system having SLC and MLC solid state devices, in order to increase system cost efficiencies and performance, the data storage system may comprise a lower amount of SLC storage space or lesser number of SLC devices as compared to MLC storage space or MLC devices. Additionally, the data storage system can be set up, according to the various embodiments of the present disclosure, to more regularly or continuously make the SLC storage space available for new page writes. In one particular embodiment, the MLC devices may be configured to store relatively more read-intensive data or data pages, being data that is rewritten relatively seldomly or is read-only, storing for example but not limited to, historical snapshot data. Because the read performance of MLC devices is the same as for SLC devices, but conventionally, MLC devices are obtainable at lower cost compared to SLC devices of similar storage capacity, the cost efficiency of the data storage system may be increased without a decrease in performance.

Accordingly, in one embodiment of the present disclosure, a snapshot or PITC may be moved to MLC storage space as soon as, or generally immediately after, the snapshot is taken, and the read performance would not be compromised. The SLC storage space may thus be maintained or reserved for active data or for receiving and handling write requests. This configuration can suitably utilize each of the solid state device types (i.e., SLC and MLC) uniquely to their advantage to help achieve or maintain high or maximum performances for read and write requests. In one embodiment, the SLC devices may be configured as RAID 10 storage space and the MLC devices may be configured as RAID 5 storage space. However, it is recognized that any RAID configuration or combination of RAID configurations may be utilized on either the SLC and/or MLC devices.

In a further embodiment, the SLC storage space may be made more regularly or continuously available by utilizing data progression techniques, which may be performed in regular, irregular, or periodic intervals, upon receiving a user request, randomly, and/or continuously or substantially continuously. Data progression may be configured to move or transfer snapshot or PITC data from SLC storage space to MLC storage space, thereby more making more efficient use of the different types of solid state devices. Additionally, because SLC storage space is utilized primarily for active data or handling write I/O, and MLC storage space is used primarily for snapshot data, the MLC storage space may receive or handle a significantly less amount of write I/O, thus decreasing the wear out rate of the MLC devices.

In conventional systems, there are certain cases where such data progression may not, however, move data quickly enough from one storage tier to another, and in the above embodiments, this may result in the SLC storage space being quickly consumed where the data is not efficiently moved to the MLC storage space. Particularly, in conventional data progression methods, the data may not be moved quickly enough from one storage tier to another in the following non-limiting example cases:

1. where volume data or other data is configured for snapshot capability but snapshots have not been enabled;
2. where volume data or other data is not associated with a snapshot schedule;
3. where volume data or other data is configured under a snapshot schedule where snapshots are generated relatively infrequently; and 4. where volume data or other data consumes a significant portion or all of the SLC storage space, which causes the system to force the SLC storage space into a conservation mode before a snapshot can be generated based on the configured snapshot schedule.

In one embodiment of the present disclosure, to better handle the cases, such as those identified above, where the data may not be moved quickly enough from one storage tier to another, the data storage system may, at times, force, in an on-demand manner, one or more volumes having the most number of SLC pages relative the other volumes, to take a snapshot of the volume data, which generally renders the data read-only making it suitable for MLC device storage, and transfer the snapshot data to MLC storage space or other relatively lower or lower cost storage tier, such as one or more disk drive tiers. In one embodiment, the system may force the on-demand snapshot when the amount of free or available space in the SLC device(s) approaches or reaches a predetermined free space threshold. The free space threshold may be set at any suitable amount of remaining free or available space, such as but not limited to, when there is 15% or less available SLC storage space, when there is 10% or less available SLC storage space, or when there is 5% or less available SLC storage space. Of course, any other amount of remaining SLC storage space may be used as a threshold, and those given are but a few non-limiting examples. This type of snapshot taken in an on-demand manner is referred to herein as an on-demand snapshot or on-demand PITC. The on-demand snapshot may be identified within the data storage system using an attribute value. Once an on-demand snapshot has been taken, and transferred to a lower tier such as MLC storage space, the data storage system may allocate new pages for write I/O of the active PITC, if not already allocated as part of copy-on-write (COW) algorithm.

In one embodiment, such on-demand snapshots are utilized by the data storage system only and are not exposed to user. That is, an on-demand snapshot may be a solely internal snapshot generated for at least the purpose of converting data to read-only or substantially read only status and move the data to MLC storage space or other relatively lower cost tier storage space. The on-demand snapshot is not typically, and in some embodiments not permitted to be, generated by the user.

In this regard, the on-demand snapshot need not be required to preserve pages that are "overwritten" (e.g., in a child PITC via a COW operation), for example but not limited to, for backup purposes or for view volume creation, described in further detail in U.S. Pat. No. 7,613,945, which was previously incorporated herein by reference. Accordingly, where a page or page range is overwritten to a child PITC, for example after a COW operation, the corresponding pages in the on-demand snapshot become unnecessary and generally useless and merely occupy space that could otherwise rejoin the free pagepool. If not returned, therefore, this could lead to increased and unnecessary space consumption, depending on, for example, the number of new page write I/Os to the volume after an on-demand snapshot is generated. The increased and unnecessary space consumption, even in the lower tiers, could starve volumes of user I/O space.

Accordingly, in one embodiment, the pages of an on-demand snapshot that have been overwritten, rendering them unnecessary, may be reclaimed through a novel and advantageous method referred to herein as pruning of on-demand snapshot pages, or on-demand snapshot prune, or the like. On-demand snapshot prune may operate to return pages to the free pagepool from the on-demand snapshot if a child PITC contains one or more pages overwriting the corresponding pages of the on-demand snapshot. On-demand snapshot prune may be configured to operate on only on-demand snapshots. On-demand snapshot prune may run at regular, irregular, or periodic intervals, upon receiving a system request, randomly, and/or continuously or substantially continuously.

In one embodiment, on-demand snapshot prune may operate on a particular page as soon as, or relatively immediately after, a page is allocated in a child of the on-demand snapshot for the same logical block address (LBA) range. Where on-demand snapshot prune is performed on such a page basis, the system may load snapshot metadata (if required or desired), update the page address, return the page to the free pagepool, and commit and unload any updated snapshot metadata. While the page basis method for on-demand snapshot prune is viable and is one embodiment of the present disclosure, such page basis, however, may not be greatly efficient due to frequent loading and unloading of snapshot metadata, resulting in a lot of read I/Os and CPU cycles, and because committing snapshot metadata for every page can lead to a lot of metadata updates (i.e., write I/Os). Additionally, the free pagepool metadata will also have to be correspondingly updated frequently, resulting in additional write I/Os. Such frequent metadata I/Os may degrade the SSDs more quickly. The above mentioned disadvantages can be reduced or avoided through batch processing of the pages.

Figure 3:
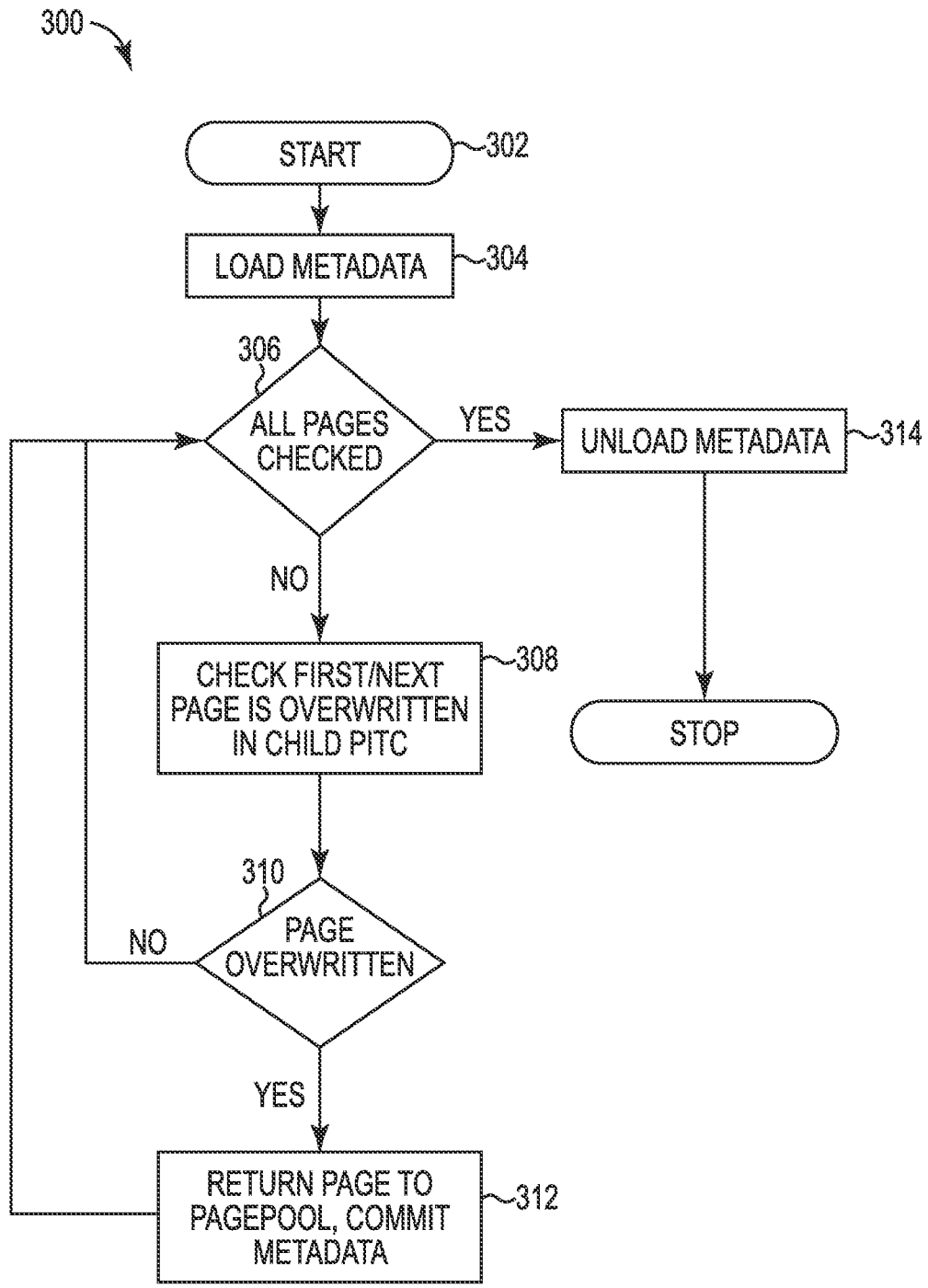
FIG. 3 is a flow diagram of a method for on-demand snapshot prune in accordance with an embodiment of the present disclosure.

One batch processing method 300 for on-demand snapshot prune is illustrated in FIG. 3. On-demand snapshot prune may start at 302 and as an initial step 304 load any metadata (if required or desired) for the on-demand snapshot. In decision step 306, the method may determine whether all pages of the on-demand snapshot have been checked. If not, the method may proceed to step 308 where a first (if on first pass) or a next (if on a subsequent pass) page of the on-demand snapshot is checked to see if it has been overwritten in a child PITC. If not, then in decision step 310, the method may return to decision step 306, otherwise in step 312, the page may be returned to the free pagepool, and any corresponding metadata updated. After returning the overwritten on-demand snapshot page to the free pagepool, the method may return to decision step 306. If in step 306 it has been determined that all pages of the on-demand snapshot have been checked, the method may proceed to step 314 where the metadata may be unloaded and the method may be completed.

As stated above, on-demand snapshot prune may run at regular, irregular, or periodic intervals, upon receiving a system request, randomly, and/or continuously or substantially continuously. In some embodiments, for a batch processing on-demand prune method, the following triggers are non-limiting examples of triggers that may cause initiation of a batch processing on-demand prune operation:

1. Pagepool Conservation and Emergency Mode
    When the free pagepool enters a conservation or emergency mode, for example, when available disk space has reached a predetermined minimum free space threshold limit, such as but not limited to 10%, 5%, or 3%, the data storage system may trigger performance of on-demand snapshot prune to prune on-demand snapshot pages, if any are available for pruning as described above.
2. Periodic Prune
    After an on-demand snapshot is generated for a volume, if the volume receives a lot of new write requests, then it may fill the active PITC more quickly and occupy space thus desirably causing on-demand prune to be run even before conventional data progression can be performed. In this regard, on-demand prune can be performed when the active PITC space consumed reaches or is a multiple of a predetermined threshold non-zero occupied space limit (such as, but not limited to, 1 GB).

3. PITC Coalesce

As will be described in further detail below, where a frozen and expired PITC is converted into an on-demand PITC as part of coalesce process, then on-demand prune may be initiated on that on-demand PITC to reclaim space, if applicable.

4. Snapshot Data Progression

On-demand snapshot prune may be initiated as part of overall processing of the on-demand snapshot pages. For example, on-demand snapshot prune may be ran once a day and shall prune all pages since the last on-demand snapshot prune process. In still other on-demand snapshot prune methods, prune may be initiated at any other regular or irregular time intervals or based upon occurrence or periodic occurrence of any other suitable event or events.

Figure 4A:
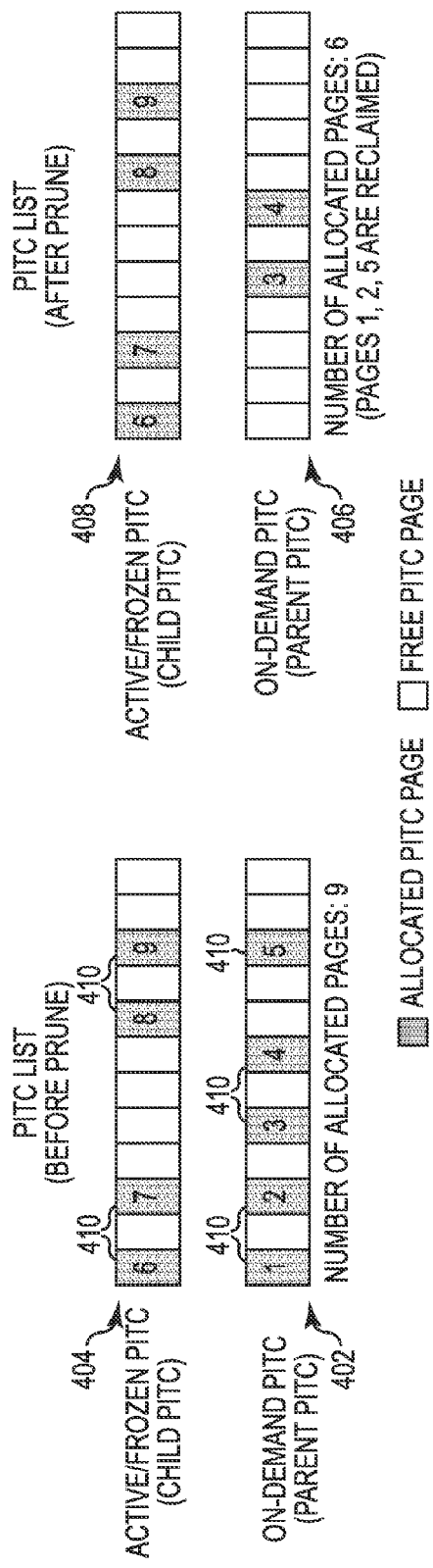
FIG. 4A is a schematic representation of an on-demand snapshot or PITC and a child PITC before and after on-demand snapshot prune has been performed in accordance with an embodiment of the present disclosure.

FIG. 4A schematically illustrates, on the left side, an on-demand snapshot or PITC 402 and child PITC 404 before on-demand snapshot prune has been performed, and, on the right side, the same snapshot 406 and child PITC 408 after on-demand snapshot prune has been performed. On the left side of FIG. 4A, a total of nine (9) data pages 410 are allocated between the on-demand PITC 402 and the child PITC 404. That is, nine pages of data are currently allocated and unavailable for new writes. However, pages 1, 2, and 5 of the on-demand PITC 402 have been "overwritten" as pages 6, 7, and 9 in the child PITC 404, and as such, pages 1, 2, and 5 of the on-demand PITC become unnecessary and simply consume otherwise valuable storage space. After on-demand snapshot prune, as described with respect to FIG. 3 above, has been performed, as illustrated on the right side of FIG. 4A, the on-demand PITC 406 only stores pages 3 and 4, which have not yet been overwritten in a child PITC, such as PITC 408. However, unnecessary pages 1, 2, and 5 have been reclaimed and returned to the free pagepool for reallocation. Unlike traditional snapshots and PITCs, as maybe seen from FIG. 4A, in one embodiment, an on-demand snapshot may not always represent data at time the snapshot was generated, for example, where an on-demand snapshot prune operation has been completed, and is one reason why, in some embodiments, on-demand snapshots are typically for internal system use only.

Figure 4B:
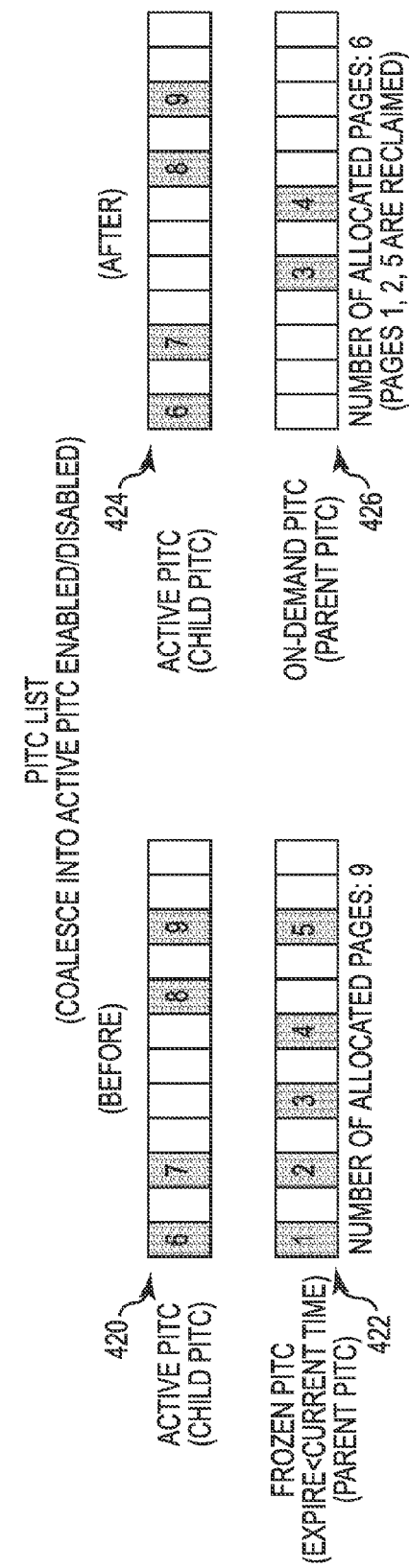
FIG. 4B is a schematic representation of a frozen and expired PITC converted into an on-demand snapshot or PITC in accordance with an embodiment of the present disclosure.

As described above, in many cases, after any given PITC expires, it no longer needs to be stored in the system nor does it need to be available for users. However, there are some cases where the expired PITC can be left in a frozen state until another snapshot is taken before coalescing is possible, thereby unnecessarily holding allocated pages hostage, resulting in unnecessary space consumption. In this regard, in one embodiment, such a frozen and expired PITC may be converted into an on-demand snapshot or PITC, as illustrated in FIG. 4B, which on the left side, schematically shows an active PITC 420 and a parent frozen and expired PITC 422, and, on the right side, schematically shows the same active PITC 424, but the parent frozen and expired PITC has been converted to an on-demand snapshot or PITC 426. Once converted to an on-demand snapshot 426, on-demand snapshot prune may be performed on the on-demand snapshot, thereby freeing overwritten pages to the free pagepool upon performance of the prune operation, rather than waiting until another child PITC is generated from the active PITC so that the frozen and expired PITC can coalesce in order to free pages. The on-demand snapshot 426 may subsequently coalesce when another child PITC is generated; however, at least the overwritten pages may be freed sooner under the on-demand snapshot prune process.

The various embodiments of the present disclosure are advantageous for a variety of reasons. For example, the various embodiment of the present disclosure can provide more efficient storage space utilization, and particularly in systems utilizing SLC and MLC devices, can more efficiently utilize the different SSD types to a system's advantage. Particularly, in data storage systems utilizing any of the various forms of data progression disclosed or incorporated herein, on-demand snapshots and the corresponding on-demand snapshot prune may permit the data storage system to more efficiently utilize SLC devices for handling the bulk or all of the write I/Os, and relatively quickly move snapshot or PITC (e.g., read-only) pages to MLC devices when desirable, without knowledge to the user, in order to efficiently relieve the SLC storage space of unnecessary over-consumption and, in the background, handle and reclaim usable space from the on-demand snapshots in MLC storage space. Of course, other advantages of the various embodiments of the present disclosure will be, or become, apparent to those skilled in the art.

In the foregoing description, various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

We claim:

1. A method of data progression in a data storage system having at least two tiers of storage space, a first tier comprising storage space in a single level cell (SLC) solid state device (SSD) and a second tier comprising storage space in a multi-level cell (MLC) SSD, the method comprising:

setting a predetermined free space threshold for the first tier of storage space that is a threshold relating to the amount of free space available on the first tier of storage space;

monitoring at least an amount of available free space in the first tier of storage space;

when the amount of available free space in the first tier of storage space decreases to the predetermined free space threshold, generating an on-demand snapshot of at least a portion of the data of the first tier of storage space by designating that data as read-only;

transferring the on-demand snapshot to the second tier of storage space, thereby freeing the corresponding at least a portion of data of the first tier of storage space for new writes;

wherein a write operation received by the data storage system directed to data stored by the on-demand snapshot is directed instead to newly allocated storage space of the first tier of storage space, and the corresponding data in the on-demand snapshot is considered to be overwritten; and when a page of the on-demand snapshot contains overwritten data, freeing that page of the on-demand snapshot, such that the page is no longer associated with the on-demand snapshot;

wherein the on-demand snapshot is utilized internally by the data storage system and is not generally accessible by a user of the data storage system.

2. The method of data progression of claim 1, further comprising, in addition to generating an on-demand snapshot, generating snapshots of at least a portion of the data of the first tier of storage space and transferring at least some of the generated snapshots to the second tier of storage space at regular intervals.

3. The method of data progression of claim 1, wherein the storage space of the SLC SSD is configured as RAID 10 storage.

4. The method of data progression of claim 3, wherein the storage space of the MLC SSD is configured as RAID 5 storage.

5. The method of data progression of claim 1, wherein the data storage system stores data for a plurality of logical volumes, and wherein the on-demand snapshot comprises data from a first of the logical volumes utilizing the most storage space in the first tier.

6. The method of data progression of claim 1, wherein the page of the on-demand snapshot is freed substantially as soon as the corresponding data is overwritten.

7. The method of data progression of claim 1, wherein the page of the on-demand snapshot is freed according to a batch pruning method that operates on at least a portion of the second tier of storage space as a batch and frees multiple pages of the batch, each page containing data considered to be overwritten.

8. The method of data progression of claim 7, wherein the batch pruning method is triggered when the amount of available free space in the second tier of storage space decreases to a predetermined free space threshold for the second tier of storage space.

9. The method of data progression of claim 7, wherein the batch pruning method is triggered according to a periodic schedule.

10. An information handling system comprising:
a data storage subsystem having at least two tiers of storage space, a first tier comprising storage space in a single level cell (SLC) solid state device (SSD) and a second tier comprising storage space in a multi-level cell (MLC) SSD;

a controller managing the data storage subsystem and configured to:
monitor at least an amount of available free space in the first tier of storage space;

when the amount of available free space in the first tier of storage space decreases to a predetermined free space threshold, generate an on-demand snapshot of at least a portion of the data of the first tier of storage space by designating that data as read-only;

transfer the on-demand snapshot to the second tier of storage space, thereby freeing the corresponding at least a portion of data of the first tier of storage space for new writes;

when a write operation is received by the data storage system directed to data stored by the on-demand snapshot, direct the write operation to newly allocated storage space of the first tier of storage space, and the corresponding data in the on-demand snapshot is considered to be overwritten; and when a page of the on-demand snapshot contains overwritten data, free that page of the on-demand snapshot, such that the page is no longer associated with the on-demand snapshot;

wherein the on-demand snapshot is utilized internally by the controller and is not generally accessible by a user of the data storage subsystem.

11. The information handling system of claim 10, wherein the storage space of the SLC SSD is configured as RAID 10 storage.

12. The information handling system of claim 11, wherein the storage space of the MLC SSD is configured as RAID 5 storage.

13. The information handling system of claim 10, wherein the controller is configured to free the page of the on-demand snapshot according to a batch pruning method that operates on at least a portion of the second tier of storage space as a batch and frees multiple pages of the batch, each page containing data considered to be overwritten.

14. The information handling system of claim 13, wherein the controller runs the batch pruning method according to a periodic schedule.

* * * * *